(12) United States Patent
Penttinen et al.

(10) Patent No.: US 8,592,001 B2
(45) Date of Patent: Nov. 26, 2013

(54) METHOD OF MAKING HEAT-STERILISED PRODUCT PACKAGE

(75) Inventors: Tapani Penttinen, Huutjärvi (FI); Kimmo Nevalainen, Kotka (FI); Erkki Laiho, Porvoo (FI); Markku Sainio, Porvoo (FI); Jurkka Kuusipalo, Tampere (FI); Antti Savolainen, Kangasala (FI); Esa Koreasalo, Valkeakoski (FI); Isto Heiskanen, Imatra (FI); Tommi Lehikoinen, Tampere (FI)

(73) Assignee: Stora Enso Oyj, Helsinki (FI)

( * ) Notice: Subject to any disclaimer, the term of this patent is extended or adjusted under 35 U.S.C. 154(b) by 1301 days.

(21) Appl. No.: 12/354,577

(22) Filed: Jan. 15, 2009

(65) Prior Publication Data
US 2009/0186135 A1      Jul. 23, 2009

Related U.S. Application Data

(62) Division of application No. 10/542,755, filed as application No. PCT/FI2004/000084 on Feb. 23, 2004, now abandoned.

(30) Foreign Application Priority Data

Feb. 21, 2003   (FI) .................................. 20030260
May 22, 2003   (FI) .................................. 20030773

(51) Int. Cl.
    *B05D 5/06*      (2006.01)
(52) U.S. Cl.
    CPC ....................................... *B05D 5/06* (2013.01)
    USPC ............................................ 427/411; 427/381
(58) Field of Classification Search
    CPC .......................................................... B05D 5/06
    USPC .................... 427/407.1, 411, 372.2, 377, 381
    See application file for complete search history.

(56) References Cited

U.S. PATENT DOCUMENTS

| | | | |
|---|---|---|---|
| 4,391,833 A | 7/1983 | Self et al. | |
| 4,516,977 A * | 5/1985 | Herbert | .................... 604/415 |
| 4,775,560 A | 10/1988 | Katsura et al. | |
| 4,784,906 A | 11/1988 | Akao | |
| 7,329,460 B2 * | 2/2008 | Penttinen et al. | .......... 428/411.1 |
| 7,435,446 B2 * | 10/2008 | Kamoshita | .................... 427/335 |
| 2002/0114933 A1 | 8/2002 | Gould | |
| 2003/0059591 A1 | 3/2003 | Penttinen et al. | |

FOREIGN PATENT DOCUMENTS

| | | |
|---|---|---|
| DE | 42 03 707 C1 | 7/1993 |
| EP | 0 313 356 A2 | 4/1989 |
| EP | 0 788 428 B1 | 8/1997 |
| FI | 92311 C | 4/1989 |
| FI | 112048 B | 10/2001 |
| FI | 20000847 A | 10/2001 |
| FI | 20011539 A | 1/2003 |
| JP | 6-135439 A | 5/1994 |
| JP | 11-010819 A | 1/1999 |
| JP | 2000-6294 A | 1/2000 |
| JP | 2002-266294 A | 9/2002 |
| JP | 2004-510603 A | 4/2004 |
| JP | 2004-533977 A | 11/2004 |
| WO | WO-97/02948 A1 | 1/1997 |
| WO | WO-98/30390 A1 | 7/1998 |
| WO | WO-01/76976 A1 | 10/2001 |
| WO | WO-02/28637 A1 | 4/2002 |
| WO | WO-03/006237 A1 | 1/2003 |
| WO | WO-2004/007195 A1 | 1/2004 |

* cited by examiner

*Primary Examiner* — William Phillip Fletcher, III
(74) *Attorney, Agent, or Firm* — Birch, Stewart, Kolasch & Birch, LLP (57) ABSTRACT

The invention relates to a polymer-coated Polymer-coated heat-sealable packaging material, heat-sterilized package formed from the material, and use of the packaging material. The material comprises a fiber base 4 (e.g., packaging board made of bleached pulp) with polymer heat-seal layers 1,9 located on both sides thereof. The package comprises, outside the fiber base, first polymer coating layer 2, which contains white pigment for covering the fiber base from sight, and second coating layer 8, which contains light-absorbing pigment. A coating layer pigmented grey inside the fiber base may provide a light shield for the packaged product. Absorbent black pigment may be located outside the fiber base underneath the white layer to stabilize the brightness of the material. A heat-sterilized package is made by providing the packaging material, forming a package containing, e.g., food, and heat-sterilizing the package in an autoclave. Yellowing of the fiber-based material is avoided by means of a white pigment.

20 Claims, 3 Drawing Sheets

METHOD OF MAKING HEAT-STERILISED PRODUCT PACKAGE

This is a divisional of application Ser. No. 10/542,755, filed Jul. 10, 2006 now abandoned, the priority of which is claimed under 35 U.S.C. §120, and the contents of which are incorporated herein by reference. Application Ser. No. 10/542,755 is the U.S. national phase of international application PCT/FI04/000084, filed Feb. 23, 2004. Priority under 35 U.S.C. §119 is claimed to Finnish application no. 20030260, filed Feb. 21, 2003, and to Finnish application no. 20030773, filed May 22, 2003.

FIELD OF THE INVENTION

The invention relates to a heat-sealed, heat-sterilised product package made of a polymer-coated, fibre-based packaging material. The invention also relates to a packaging material suitable for such a package and to the use of the material.

BACKGROUND OF THE INVENTION

There are numerous known applications of polymer-coated fibre-based packaging materials, in which one or both sides of the fibre base are provided with one or more successive coating layers and which are intended for various packaging purposes. The coating can optionally achieve a moisture, oxygen and/or light barrier, which is intended to improve the storage life of the packaged product and thus to extend its effective storage and/or "best before date". The coating also provides a heat-sealable material, enabling a tight seal of the product package. Food packages constitute one principal field of application for such packaging materials, which are used for instance for cartons, casings and boxes formed of coated packaging board and pouch packages formed of coated paper.

Heat-sterilised packages form a notable group of sealed food packages, the packaging material of these being required to withstand sterilising treatment conditions. Sterilisation may be performed by irradiation or by hot pressurised steam in an autoclave Closed metal cans have typically been treated in autoclaves, however, nowadays also fibre-based packaging materials are available for autoclave applications. WO 02/28637 thus describes a packaging material for autoclave packages, in which the board substrate is equipped with an oxygen barrier layer, polymer heat-sealing layers and binder layers required between these. In this publication, the oxygen barrier layer is preferably formed of an aluminium foil, even though EVOH is also mentioned as an optional material. The proposed material for the binder and heat-sealing layers is polypropene, which resists, without melting, the temperature above 130° C. prevailing in an autoclave.

In tests of heat-sterilised fibre-based food packages, the applicant has found the problem of bleached packaging board coated merely with polymer oxygen-barrier and heat-sealing layers tending to yellow due to heating. This is especially true for packages treated in autoclaves, which are required to resist the high autoclave temperature and pressure over the required treatment period, about 30 minutes in general. In other words, a package made of polymer-coated board gets another appearance during autoclave treatment, and this is a drawback in the market, especially in demanding applications.

SUMMARY OF THE INVENTION

The purpose of the present invention is to eliminate the problem mentioned above and to provide a sterile package made of a fibre-based material, whose material in addition to the fibre base comprises only polymer coating layers, which achieve the sealability, heat resistance and light shield required for the product, and in which also yellowing of the material as a result of heating treatment has been substantially avoided. The product package of the invention is characterised by the fact that the polymer coating layer outside the fibre base of the package contains a white pigment and in that the second polymer coating layer included in the packaging material contains a light-absorbing pigment.

In the package of the invention, white pigment is used to hide the fibre base so that yellowing caused by heating does not significantly affect the aspect of the package, more precisely its ISO brightness. The light absorbent pigment, in turn, which has been placed in a coating layer different from that of the white pigment imparting the package its brightness, shields the packaged product from visible light. In addition, in accordance with the invention, light-absorbing black pigment can also be used as an agent for stabilising the light appearance of the package as described in the following.

In accordance with the invention, without the use of an aluminium foil, a fibre-based packaging material has thus been achieved, which resists heat sterilization, especially autoclave treatment at high temperature and under vapour pressure, the polymer coating layers in the material forming the light shield required for the storage life of the product and which also meets the requirements posed on the appearance of the finished package to be marketed. The light shield can be formed with polymer layer toned grey with a black and a white pigment, e.g. as in WO 01/76976, the polymer layer forming an inner layer that replaces the conventional aluminium foil of the package, whereas on the opposite side of the package, i.e. on its outer surface, merely white pigment can be used, which affects the package appearance substantially by covering the discoloration of the fibre base caused by heating treatment.

An optional solution of the invention is to provide two successive pigmented polymer layers outside the fibre base in the package, with the outer polymer layer containing 5 to 25% of white pigment and the inner polymer layer closer to the fibre base containing black pigment in a small amount. These successive pigmented layers allow the light tone of the packaging material to be effectively stabilised despite yellowing of the subjacent fibre base. The overall colour of the material is then white or light grey, slightly toned grey under the effect of the black pigment underneath the white pigment. The brightness degree depends on the pigment amounts used and their mutual ratios, however, the idea is to adjust the material tone as close to white as possible and to maintain this tone during the heating treatment of the package.

A small amount of black pigment provided under a white-pigmented layer has a slightly light-absorbing effect. This effect may yet be inadequate in shielding the packaged product from light penetrating the material. If desired, more effective light-shielding pigmentation can be achieved by providing the polymer coating inside the package with a sufficient amount of light-absorbing pigment, e.g. by toning at least one inner coating layer of the fibre base grey, as disclosed in the WO patent specification 01/76976 mentioned above.

The desired material toning can be achieved with successive pigmented layers, whose total weight is 25 to 60 g/m$^2$, the black pigment concentration of the inner layer being in the range 0.05 to 0.5%, preferably approx. 0.06 to 0.15%, and the white pigment concentration in the outer layer being in the range 5 to 25%, preferably approx. 7 to 12%. Optionally, the inner layer containing black pigment can also be admixed with white pigment so as to get an overall light grey tone of the layer. The proportion of white pigment in the inner layer could thus be 5 to 25%, preferably 7 to 15%. Carbon black, for instance, is suitable as a black pigment, and titanium dioxide as a white pigment.

In a preferred embodiment of the invention, the package material comprises on both sides of the fibre base an outer transparent heat-sealing layer, with the pigmented polymer layers located inside these. This avoids the pigmented layer from getting into direct contact with the product to be packaged, which is prohibited by foodstuff legislation or regulations in a number of countries. However, the inner pigmented polymer layer may contain the same heat-sealable polymer as the outer layer and it may be located immediately underneath this, so that these layers during heat sealing act as a single uniform material layer forming the seam.

In an autoclave package, the fusion point of the polymer in the heat-sealing layer should be at least approx. 130° C., thus avoiding fusion of the polymer in the autoclave. Polypropene is an example of such heat-sealable polymers.

Depending on the packaged product, the package material may further comprise one or more polymer oxygen-barrier layers, which most advantageously are located inside the package, between the fibre base and the pigmented light-shield layer. Especially ethylene vinyl alcohol copolymer (EVOH) and polyamide (PA) are suitable materials of the oxygen-barrier layer.

In the package of the invention, the fibre base of the material may consist particularly of a packaging board made of bleached pulp, having a weight in the range 130 to 500 g/m$^2$, or a packaging paper having a weight in the range 20 to 120 g/m$^2$. These are suitable for heat-sealable casing or carton packages or poach packages to be treated in an autoclave.

The heat-sealable packaging material of the invention, which is suitable for sterile packages as described above, comprising a fibre base and polymer heat-seal layers on its both sides, is characterised by the fact that pigment has been incorporated in the polymer layers on both sides of the fibre base, with the fibre base being hidden with white pigment on one side of the fibre base, and with a light-absorbing pigment forming a light shield for the packaged product on the opposite side of the fibre base. Such a material can be used for forming a light-shielding package for the product, which can be sterilised without any yellowing caused by heating substantially altering the aspect of the package.

The invention further comprises the use of the fibre-based, polymer-coated packaging material tinted by pigmenting on both sides in packages to be sterilised by heating. The invention relates in particular to the use of one of the packaging materials described in further detail above in food packages that have been sealed by heat sealing and are intended for treatment in an autoclave.

BRIEF DESCRIPTION OF THE DRAWINGS

The invention is described in greater detail below by means of examples and with reference to the accompanying drawings, in which.

DETAILED DESCRIPTION

The polymer-coated packaging board of FIG. 1 comprises in the following order: an outer heat-sealing layer 1 made of polypropene (PP), an inner polypropene heat-sealing layer 2 pigmented white with titanium dioxide, a fibre base 4 made of bleached board, a polyamide (PA) oxygen-barrier layer 5 adhered directly to the fibre base, an EVOH oxygen-barrier layer 6, a polymer binder layer 7, a heat-sealable polypropene layer 8, which has been toned grey by means of carbon black and titanium dioxide, and a heat-sealing, layer 9 made of polypropene. The successive coating layers can be produced on different sides of the board 4 by means of coextrusion. The material can be bent and heat-sealed to form a closed product package preferably with the polypropene layer 2 tinted white with titanium dioxide placed on the outer surface of the package, i.e. outside the fibre base 4, and with the polypropene layer 8 tinted grey by means of carbon black and titanium dioxide placed on the inner surface of the package, i.e. inside the fibre base 4. Owing to the layer 2 containing white pigment, the material generally preserves its brightness in a heat-sterilising treatment of the package made from it, such as autoclave treatment, despite any yellowing of the fibrous substrate 4. The grey layer 8 has the function of shielding the packaged product from light.

Figure 1:
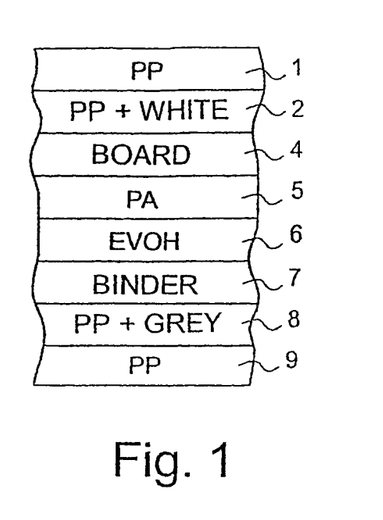
FIGS. 1 to 10 are schematic views of ten different layered packaging materials of the invention.
Figure 2:
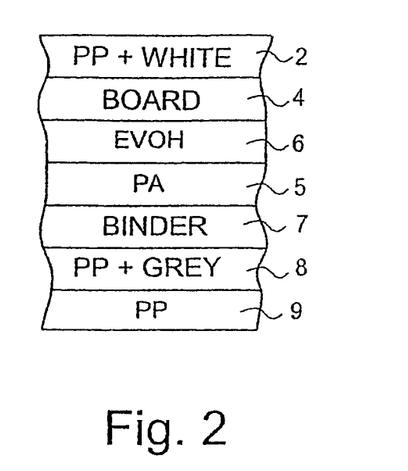

The packaging material shown in FIG. 2 differs from the one of FIG. 1 only in that the polypropene heat-sealing layer placed on the outer surface of the package has been omitted and in that the mutual order of PA and EVOH oxygen-barrier layers 5, 6 in the material has been changed. Thus the polypropene layer 2 tinted white with litanium dioxide is on the outer surface of the material, where it serves alone as a heat-sealable layer.

Figure 3:
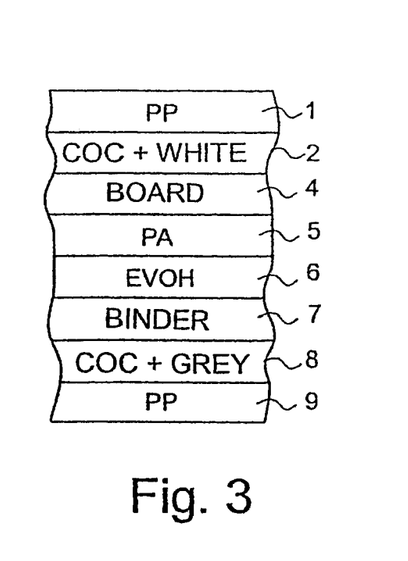

The packaging material of FIG. 3, again, differs from the one shown in FIG. 1 only in that the material of the pigmented polymer layers 2, 8 on both sides of the fibre base 4 is cyclo-olefin copolymer (COC) instead of polypropene. COC is a polymer obtained by copolymerisation of ethene and norbornene, which is poorly vapour-permeable and whose application in layered packaging materials is known per se.

Figure 4:
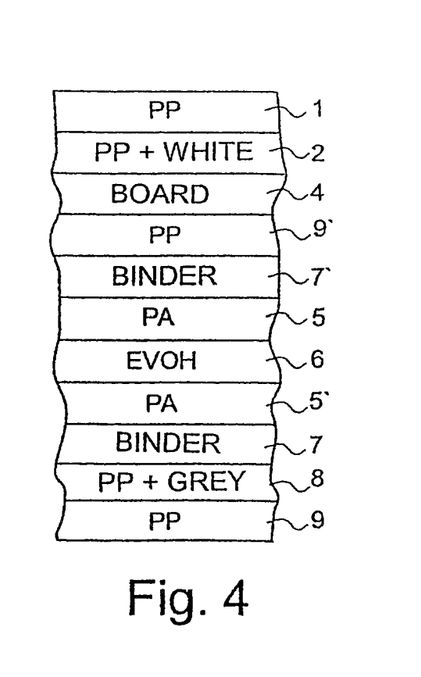

The package material of FIG. 4 consists of a polypropene layer 1, a polypropene layer 2 pigmented white with titanium dioxide, a fibre base 4, a polypropene layer 9', a binder layer 7', a PA oxygen barrier layer 5, an EVOH oxygen barrier layer 6, a second PA oxygen-barrier layer 5', a second binder layer 7, a polypropene layer 8 pigmented grey with carbon black and titanium dioxide, and a polypropene layer 9. In this multilayer structure, the adhesion of the oxygen-barrier layers 5, 6 to the fibre base 4 has been ensured by means of intermediate polypropene and binder layers 9', 7', which may be necessary in demanding applications, such as packages treated in autoclaves. This application has i.a. the special feature of a symmetrical five-layer combination of oxygen-barrier and binder layers 7', 5, 6, 5', 7, which is advantageous when successive polymer layers are formed by coextrusion. Optionally the five-layer structure of the material consisting of polypropene, binder, EVOH and PA oxygen-barrier layers 9', 7', 5, 6, 5' can be applied onto the board 4 as a separately manufactured film laminate, which are commercially available in the market. The laminate is then sealed on the board 4 at the same time as the outer polypropene layers 1, 2, 8, 9 are incorporated in the final material by co-extrusion.

Figure 5:
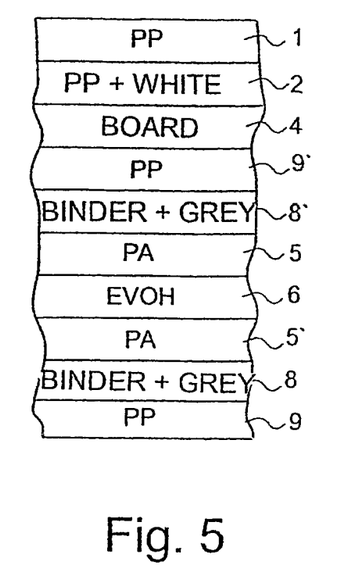
Figure 6:
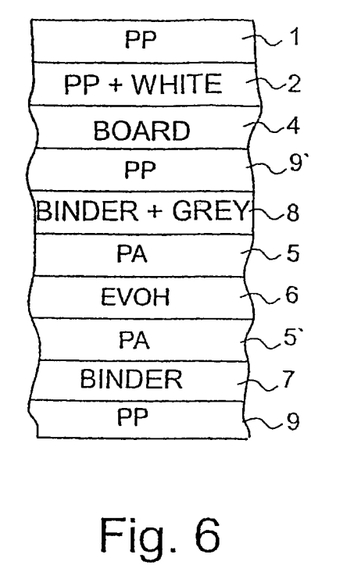

The packaging material of FIG. 5 differs from the one shown in FIG. 4 in that the grey pigment composition is admixed in the two binder layers 8, 8' of the structure, so that the number of coating layers is reduced by one. The material comprises a co-extruded seven-layer structure 9, 8', 5, 6, 5', 8, 9, which is symmetrical relative to the central EVOH layer 6. FIG. 6 further shows a variant of the material of FIG. 5, in which only the innermost binder layer 8 contains grey pigment. This has the advantage of the separately manufactured five-layer film laminate 5, 6, 5', 7, 9 mentioned above, which can be sealed to the final layered packaging material as an integral assembly.

In the packaging materials of FIGS. 1 to 6, the fibre base 4 may consist of a packaging board containing bleached sulphate pulp, having a weight in the range 130 to 500 $g/m^2$, preferably 170 to 300 $g/m^2$. If the fibre base optionally consists of bleached paper, it may have a weight in the range 20 to 120 $g/m^2$. The weight of the PA and EVOH oxygen-barrier layers 5, 6 may be 3 to 15 $g/m^2$, preferably 50 to 10 $g/m^2$. The weight of the transparent polypropene layers 1, 9 placed outermost in the material can be 5 to 30 $g/m^2$, preferably 7 to 20 $g/m^2$, and the inner pigmented polypropene layers 2, 8 adjacent these outer polypropene layers may have a weight in the range 10 to 50 $g/m^2$, preferably 25 to 40 $g/m^2$. The titanium dioxide concentration of the white-pigmented polypropene layer 2 may be 5 to 25%, preferably approx. 7 to 12%. The carbon black concentration in the grey-pigmented polypropene layer 8 may be 0.05 to 0.5%, preferably approx. 0.12 to 0.15% and the titanium dioxide concentration accordingly 5 to 25%, preferably approx. 7 to 12%. The binder layers 7, whose material is appropriately i.a. the polymer marketed by the company Mitsui Chemicals under the trade name Admer, may have a weight in the range 3 to 15 $g/m^2$, preferably 5 to 10 $g/m^2$. If the polymer material of the pigmented layers 2, 8 is COC or Admer instead of polypropene, the layer weights and pigment concentrations of the pigmented layers mentioned above apply to these as well.

The polymer-coated packaging board of FIG. 7 comprises in the following order: a coating layer 2 pigmented white with titanium dioxide, a coating layer 3 pigmented with carbon black, a fibre base 4 made of bleached board, a light-shield layer 8 toned grey with titanium dioxide and carbon black so as to resemble an aluminium foil, and a transparent heat-sealing layer 9. The polymer material of all of the coating layers 2, 3, 8, 9 is polypropene. The successive coating layers can be formed on different sides of the fibre base 4 by co-extrusion. The material can be bent and heat-sealed to form a closed product package so that the successive, pigmented polymer layers 2, 3 are place don the outer surface of the package, i.e. outside the fibre base 4, and the grey light-shield layer 8 and the transparent heat-sealing layer 9 are placed on the inner surface of the package, i.e. inside the fibre base 4. The outer successive pigmented layers 2,3 of the package impart the package a light, almost white shades which does not change in a heat-sterilising treatment of the package.

Figure 7:
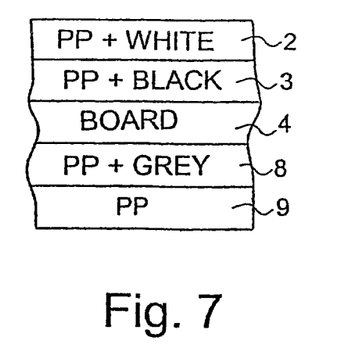
Figure 8:
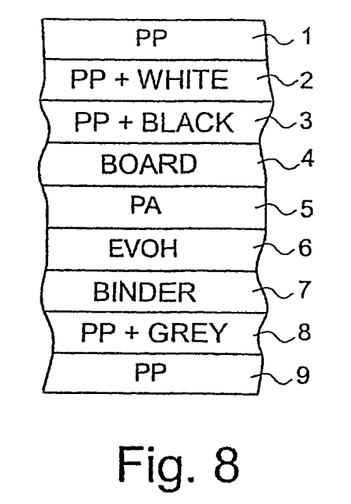

FIG. 8 shows a packaging board suitable especially for food packages treated in autoclaves, in which, compared with FIG. 7, there are the following added layers: a transparent polypropene heat-sealing layer 1 placed on the outer surface of the package, polyamide and EVOH oxygen-barrier layers 5, 6 inside the fibre base 4, and a binder layer 7 adhering to the light-shield layer 8 of the EVOH layer 6, whose material is e.g. the polymer marketed the company Mitsui Chemicals under the trade name Admer. Consequently, the package formed of the material is protected with pigmented layers 2, 3 against any yellowing of the fibre base 4 occurring in autoclave treatment, and the oxygen-barrier layers 5, 6 and the light-shield layer 8 inside the package protect the packaged product and extend its storage life and best before date.

Figure 9:
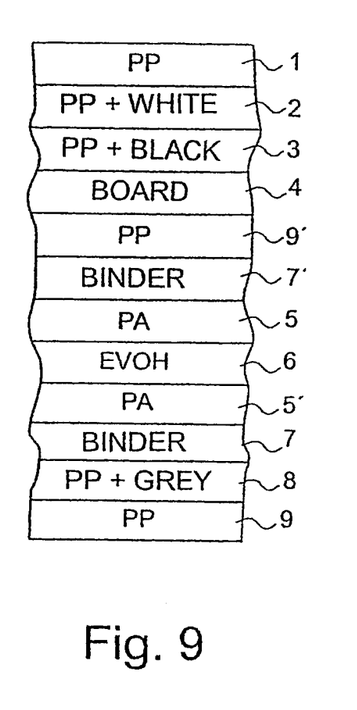

FIG. 9 shows a modification of the packaging board of FIG. 8, to which a second polyamide layer 5' and polypropene and binder layers 9', 7' have been added between the fibre base 4 and the polyamide layer 5. The arrangement enhances the adhesion between the oxygen-barrier layers and the fibre base. Additional features consist of the symmetrical five-layer combination of the binder 7', polyamide 5, EVOH 6, polyamide 5' and binder 7, which is an advantage when coating layers are formed by co-extrusion, and the provision for incorporating the five-layer structure of polypropene 9', binder 7', polyamide 5, EVOH 6 and polyamide 5' as a film laminate in the material, such film laminates being commercially available in the market. Such a finished laminate can be sealed to the board at the same time as the other coating layers of the material are produced by co-extrusion.

Figure 10:
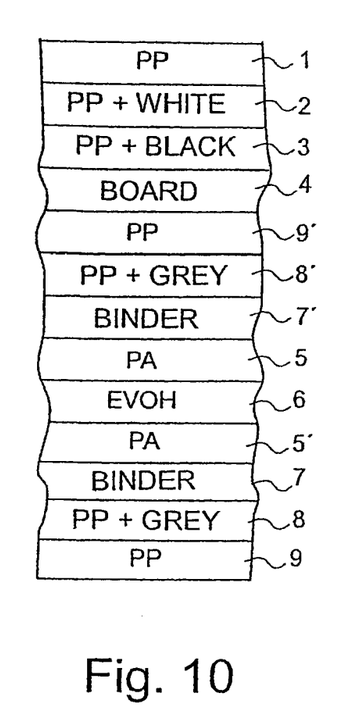

FIG. 10 shows a second modification of the packaging material, which differs from the one shown in FIG. 9 only in that a second grey-pigmented light-shield layer 8' has been added inside the fibre base 4, so that the layer combination inside the fibre base has been made symmetrical in its totality, which is and advantage in terms of co-extrusion.

In the packaging materials of FIGS. 7 to 10, the white-pigmented layer 2 outside the fibre base 4 may be 20 to 50 $g/m^2$, and the layer 3 containing black pigment may have a weight in the range 5 to 10 $g/m^2$. The grey-pigmented light-shield layer 3 inside the fibre base 4 may have a weight in the range 10 to 50 $g/m^2$, preferably 25 to 40 $g/m^2$. The titanium dioxide concentration in the white-pigmented coating layer 2 may be in the range 5 to 25%, preferably 7 to 12%. The carbon black concentration in the inner coating layer 3 may be 0.05 to 0.5%, preferably 0.06 to 0.15%. If the layer 3 contains also titanium dioxide, it may have a concentration in the range 5 to 25%, preferably 7 to 15%. In other respects, the material layer weights are equal to those defined in conjunction with FIGS. 1 to 6.

The packaging boards intended for use in autoclaves illustrated in FIGS. 1 to 10 can be varied in different ways within the scope of the invention. Adequate oxygen barrier can be provided by means of one single EVOH layer 6, for instance, and then the polyamide layers can be omitted. If the pigmented layers on the outer surface of the package are used as heat-sealing layers, the outermost transparent heat-sealing layer 1 may also be superfluous. The innermost layer 3 containing black pigment, which is possibly provided, may be optionally admixed with white pigment, e.g. titanium dioxide, and then the layer gets a light grey overall shade.

Figure 11:
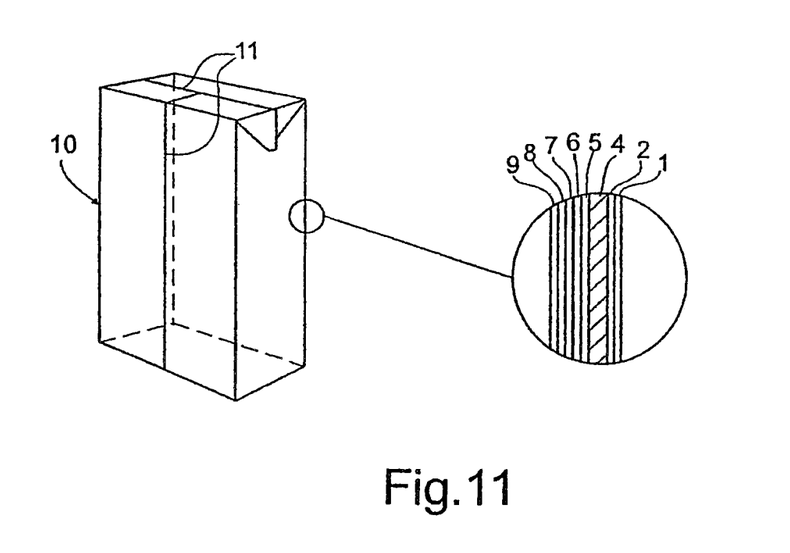
FIG. 11 shows a package made from the packaging material of FIG. 1 by bending and heat sealing.

FIG. 11 shows a closed package product 10 shaped as a rectangular prism, which has been manufactured by bending and heat sealing blanks of the packaging material of FIG. 1. The figure includes a partial enlargement of the package wall, showing that the polymer layer 2 tinted white by pigmenting is placed outside the substrate board 4 in the package, and that the grey-pigmented polymer-layer 8 is placed inside this. Thus the outer surface of the package is white and its inner surface is grey, resembling an aluminium foil. At the seam points 11 of the package, the blank edges are overlapping and the polypropene layers 1, 2, 8, 9 of the opposite board sides are tightly heat sealed together. In addition to the outermost transparent layers 1, 9, the pigmented polypropene layers 2, 8 also contribute to the heat sealing. The package is intended for sterilisation at the autoclave temperature of approx. 130° C., at which the white layer 2 prevents the package from yellowing.

The material of package 10 of FIG. 11 can be varied, for instance by using any of the packaging materials illustrated in FIGS. 2 to 10. In accordance with the invention, it is further possible to exclude the light-shield layer 8 inside the package from the materials of FIGS. 7 to 10, provided that the outer layer 3 containing black pigment gives adequate light shield for the product. It is further possible, within the scope of the invention, to provide sterilised heat-sealed poach packages having a fibre base of paper and a weight in the range 20 to 120 $g/m^2$.

The following examples comprise experiments, which have primarily tested the effect achieved with pigments added to the polymer coating in covering yellowing of the fibre base of the packaging material during autoclave treatment. The examples have also measured the protection against humidification of the fibre base provided by polymer coatings. The autoclave treatment does not affect the light shield achieved with pigments on the opposite side of the fibre base, and this is why this effect has not been tested.

EXAMPLE 1

Pieces of fibre-based packaging material were tested in an autoclave, in which the saturated vapour had a temperature of 130° C. The fibre base of the material consisted of a packaging board made of bleached pulp having a weight of 250 g/m$^2$. The test material 1 consisted of this material as such. Test material 2 consisted of said board, with an aluminium foil laminated on its other side by means of a low-density polyethene (LDPE) layer having a weight of 20 g/m$^2$, which acted as a binder. Test materials 3 to 11 were layered packaging materials, whose substrate consisted of said test material 2 and in which the board was equipped, on the side opposite to the aluminium foil, with one single polymer coating layer. The polymer of this layer was polyethene (test material 3), polypropene (test materials 4 and 5), a mixture of 70% polypropene and 30% polyethene (test materials 6 and 7), a pigmented mixture of 92% of the mixture of polypropene and polyethene above and 8% titanium dioxide (test materials 8 and 9), and also cyclo-olefin copolymer (COC), which was the product Topas 8007D, producer Ticona GmbH.

The test material pieces were heated in an autoclave for 20 minutes at room temperature to the treatment temperature of 130° C., at which the pieces were maintained for 0, 20, 40 or 60 minutes. After the treatment, the autoclave was cooled within 20 minutes, resuming room temperature, at which the test pieces were removed from the autoclave. For each test material, the brightness (ISO %) of the polymer-coated side of the material, i.e. opposite to the aluminium foil, was measured before the autoclave treatment (initial brightness) and after autoclave treatments of different durations. Accordingly, the moisture content of the materials was measured before the autoclave treatment (initial moisture) and after autoclave treatments of different durations. The results are presented in the following table 1, which also indicates the weight of the polymer-coating layer in each of the test materials 3 to 11.

The results show that regarding polymer-coated test materials 4 to 11, the fibre base had 14% maximum moisture content after autoclave treatment, which is still an acceptable value in view of the autoclave treatment of a package made of this material. In test material 3, the LDPE coating layer melted at autoclave temperature, and this is why the moisture content of the fibre base was not measured. Measurements of test material 2, i.e. uncoated aluminium/LDPE/board laminate, indicate strong water soaking of the unprotected fibre base in the autoclave.

A study of the measured brightness values before the autoclave treatment and after various treatment durations shows a progressive decrease in brightness as the treatment period increases, which is due to yellowing of the fibre base, which is not at all covered by the colourless polymer surface. With test materials 8 and 9, in which the polymer coating layer was pigmented, the brightness reduction was however substantially less than with materials equipped with an unpigmented colourless polymer coating. Consequently, white TiO$_2$ pigment allows the yellowing of a fibre base occurring in autoclave treatment to be covered to a considerable extent.

EXAMPLE 2

A series of tests in conformity with example 1 was made with materials, in which the fibre base consisted of packaging board made of bleached pulp, having a weight of 210 g/m$^2$ (test material 1). On one side of this board, an aluminium foil (test material 2) had been laminated by means of an LDPE binder layer having a weight of 20 g/m$^2$, and the opposite side of the board was additionally equipped with a two-layered polymer coating, whose inner layer contained a mixture of 70% of polypropene and 30% of polyethene, to which had been added titanium dioxide in various amounts, and whose outer layer was pure polypropene (test materials 3 to 12). The measured moisture contents of the fibre base and the brightness on the polymer coating side in the material before and after the autoclave treatment are shown in table 2. The table also contains the layer weights of the inner pigmented and the outer unpigmented polymer layers, respectively.

TABLE 1

| Test material | Coating amount g/m$^2$ | Moisture (%) | | | | | Brightness (ISO %) | | | | |
|---|---|---|---|---|---|---|---|---|---|---|---|
| | | Initial | 0 min. | 20 min. | 40 min. | 60 min. | Initial | 0 min. | 20 min. | 40 min | 60 min. |
| 1 | — | 4.4 | — | — | — | — | 87.06 | — | — | — | — |
| 2 | 0 | 5.0 | 31.8 | 31.9 | — | — | 86.07 | 78.46 | 74.46 | — | — |
| 3 | 44.7 | 5.9 | — | — | — | — | — | — | — | — | — |
| 4 | 28.0 | 5.8 | 10.0 | 12.6 | 13.5 | 14.0 | 86.05 | 78.52 | 71.92 | 68.10 | 65.12 |
| 5 | 53.2 | 5.7 | 8.3 | 10.8 | 11.3 | 11.9 | 85.99 | 79.44 | 72.67 | 68.30 | 65.12 |
| 6 | 30.7 | 5.7 | 10.1 | 12.0 | 13.2 | 13.6 | 86.01 | 78.68 | 71.61 | 67.55 | 64.97 |
| 7 | 57.9 | 5.8 | 8.8 | 10.8 | 12.1 | 12.2 | 86.18 | 79.63 | 72.09 | 68.13 | 65.62 |
| 8 | 41.9 | 5.8 | 9.3 | 11.7 | 12.5 | 13.0 | 89.68 | 85.98 | 83.55 | 81.91 | 80.89 |
| 9 | 30.4 | 5.6 | 10.1 | 12.2 | 13.2 | 13.7 | 89.14 | 84.47 | 81.08 | 79.44 | 78.19 |
| 10 | 15.4 | 5.6 | 8.7 | 10.9 | 12.3 | 12.8 | 85.61 | 78.40 | 70.66 | 65.49 | 62.75 |
| 11 | 23.3 | 5.8 | 7.8 | 9.5 | 11.0 | 11.6 | 85.63 | 77.98 | 69.98 | 65.00 | 62.04 |

TABLE 2

| Test material | Coating amount g/m² Pigmented inner layer | Coating amount g/m² Colourless outer layer | Moisture (%) Initial | Moisture (%) 0 min. | Moisture (%) 20 min. | Moisture (%) 40 min. | Moisture (%) 60 min. | Brightness (ISO %) Initial | Brightness (ISO %) 0 min. | Brightness (ISO %) 20 min. | Brightness (ISO %) 40 min. | Brightness (ISO %) 60 min. |
|---|---|---|---|---|---|---|---|---|---|---|---|---|
| 1 | — | — | 4.6 | — | | — | — | 86.1 | — | | — | — |
| 2 | 0 | 0 | 4.7 | — | — | — | — | 84.2 | — | — | — | — |
| 3 | 12.1 | 23.7 | — | 10.6 | 12.6 | 13.5 | 14.0 | 86.7 | 81.3 | 76.8 | 74.0 | 71.7 |
| 4 | 20.7 | 25.7 | 5.8 | 10.2 | 11.8 | 12.6 | 13.6 | 87.5 | 83.1 | 79.7 | 77.2 | 75.5 |
| 5 | 21.4 | 39.9 | — | 9.7 | 11.2 | 12.1 | 12.8 | 87.5 | 83.3 | 79.9 | 77.6 | 75.7 |
| 6 | 10.7 | 25.3 | — | 10.5 | 12.7 | 13.5 | 14.4 | 86.9 | 82.9 | 77.5 | 74.9 | 72.8 |
| 7 | 19.8 | 26 | 5.6 | 9.9 | 11.9 | 12.8 | 13.5 | 87.6 | 84.2 | 80.0 | 77.6 | 76.0 |
| 8 | 19.1 | 32.7 | — | 9.6 | 11.3 | 12.1 | 13.0 | 87.7 | 84.6 | 80.7 | 77.2 | 77.2 |
| 9 | 11.2 | 28.6 | — | 10.3 | 12.3 | 13.1 | 13.8 | 87.1 | 82.2 | 78.6 | 75.7 | 74.5 |
| 10 | 21.2 | 24.9 | 5.6 | 9.7 | 11.4 | 12.3 | 13.1 | 88.0 | 84.4 | 81.6 | 79.6 | 78.7 |
| 11 | 19.6 | 31.3 | — | 9.5 | 11.1 | 11.9 | 12.7 | 88.4 | 84.9 | 82.4 | 80.5 | 79.8 |

The results indicate a decrease in the brightness of the material as the autoclave treatment period increases, however, a comparison of the results with the brightness of the materials equipped with an unpigmented polymer coating of table 1 shows the considerable effect of the titanium dioxide pigment in covering the yellowing of the fibre base, the effect increasing with an increase of the pigment concentration and the weight of the pigmented layer, i.e. the layer thickness. A still better covering effect can obviously be achieved by further increasing the layer thickness of the pigmented polymer layer.

EXAMPLE 3

In this example, the test series was performed with test materials free from aluminium, whose fibre base consisted of a packaging board made of bleached pulp, having a weight of 210 g/m² (test material 1). On one side, the board was coated with a polymer layer, in which polypropene was admixed with 7.5% of titanium dioxide and having a layer weight of 58 g/m² (test material 2). The opposite side of the board was coated with an unpigmented polymer coating layer (test material 3 to 6), or with a layered structure formed of two or three successive unpigmented polymer layers (test materials 7 to 11). The materials of the coating layers was polypropene (test materials 3 and 4), a mixture of 70% of polypropene and 30% of polyethene (test materials 5 and 6), a two-layered structure, whose inner layer was COC (Topas 8007D) and outer layer said mixture of polypropene and polyethene (test material 7), a three-layered structure, whose innermost layer was polyamide, following layer a binder (Admer NF 912E) and outermost layer said mixture of polypropene and polyethene (test materials 8 and 9), or a three-layered structure, whose innermost layer was ethyl vinyl alcohol copolymer, intermediate layer a binder (Admer NF 912E) and outermost layer polypropene. The weights of the polymer layer(s) on the unpigmented side of the fibre base are indicated in the following table 3.

TABLE 3

| Test material | Coating amounts, g/m² Innermost layer | Coating amounts, g/m² Interm. layer | Coating amounts, g/m² Outermost layer | Moisture (%) Initial | Moisture (%) 0 min. | Moisture (%) 30 min. | Moisture (%) 60 min. | Brightness (ISO %) Pigmented side Initial | Brightness (ISO %) Pigmented side 60 min. | Brightness (ISO %) Unpigmented side Initial | Brightness (ISO %) Unpigmented side 60 min. |
|---|---|---|---|---|---|---|---|---|---|---|---|
| 1 | — | — | — | — | — | — | — | — | — | — | — |
| 2 | — | — | 0 | — | — | — | — | 87.9 | — | 85.8 | — |
| 3 | — | — | 69.4 | — | 10.4 | 12.9 | 14. | 87.8 | 82.5 | 83.3 | 63.8 |
| 4 | — | — | 41.7 | — | 10.9 | 13.9 | 15. | 87.9 | 82.1 | 83.7 | 64.7 |
| 5 | — | — | 62.1 | — | 10.6 | 13.4 | 15. | 87.3 | 80.7 | 83.6 | 64.7 |
| 6 | — | — | 38.4 | — | 11.4 | 14.4 | 15. | 88.1 | 82.5 | 83.9 | 65.5 |
| 7 | 22.5 | — | 33.1 | — | 10.0 | 12.8 | 13. | 87.7 | 80.8 | 83.3 | 62.3 |
| 8 | 13.2 | 6.3 | 42.0 | — | 11.4 | 14.4 | 15. | 87.4 | 81.5 | 83.5 | 62.2 |
| 9 | 12.9 | 5.9 | 50.4 | — | 11.4 | 14.2 | 15. | 87.8 | 81.9 | 83.4 | 61.5 |
| 10 | 10.4 | 5.6 | 42.1 | — | 10.8 | 14.3 | 15. | 88.1 | 82.7 | 83.5 | 64.2 |
| 11 | 11.5 | 6.1 | 51.7 | — | 10.8 | 13.8 | 15. | 82.6 | 82.6 | 83.5 | 63.6 |

The autoclave treatments of the test materials were performed in the same manner as in examples 1 and 2, except that the duration of the autoclave treatment at a temperature of 130° C. was 0, 30 or 60 minutes, respectively, and the initial brightness of the material and brightness after a 60 minute autoclave treatment were measured on both sides of the material.

The results of table 3 show the crucial difference in the change of the brightness between the fibre base sides coated with pigmented and unpigmented coating. On the pigmented side, there was a slight decrease in the brightness of the material, and in all the cases, the brightness value after one hour of autoclave treatment was above 80% ISO. On the unpigmented side of the material, the brightness decreased notably as a result of yellowing of the fibre base, which the colourless coating layers are unable to cover.

EXAMPLE 4 (Comparative)

A test series was performed with a packaging material, whose fibre base consisted of a packaging board made of bleached pulp having a weight of 210 m/m². The board was coated on one side with a polymer layer covering against yellowing, in which polypropene was admixed with 7.5% of titanium dioxide and whose layer weight was 58 g/m². The opposite board side was coated with an unpigmented polymer coating layer (test materials 1 to 4) or a layer structure formed of two or three successive unpigmented polymer layers (test materials 5 to 9). The coating layer materials were polypropene (test materials 1 and 2), a mixture of 70% of polypropene and 30% of polyethene (test materials 3 and 4), a two-layered structure, whose inner layer was COC (Topas 8007D) and outer layer said mixture of polypropene and polyethene (test material 5), a three-layered structure, whose innermost layer was polyamide, following layer a binder (Admer NF 912E) and outermost layer said mixture of polypropene and polyethene (test materials 6 and 7), or a three-layered structure, whose innermost layer was ethyl vinyl alcohol polymer, intermediate layer a binder (Admer NF 912E) and outermost layer polypropene (test materials 8 and 9).

The test material pieces were heated in an autoclave for 20 minutes at room temperature to a treatment temperature of 130° C., at which the pieces were kept for 60 minutes. After the treatment, the autoclave was cooled in 20 minutes, resuming room temperature, at which the test pieces were removed from the autoclave. The brightness (ISO %) on each side of each test material was measured before the autoclave treatment (initial brightness) and after the autoclave treatment. The results are shown in table 4, which also indicates the weights of the unpigmented polymer coating layers in each test material 1 to 9.

TABLE 4

| | Coating amounts g/m² | | | Brightness (ISO %) | | | |
|---|---|---|---|---|---|---|---|
| | Inner- | Inter- | Outer- | Pigmented side | | Unpigmented side | |
| Test material | most layer | mediate layer | most layer | Initial | 60 minutes | Initial | 60 minutes |
| 1 | — | — | 69.4 | 87.8 | 82.5 | 83.3 | 63.8 |
| 2 | — | — | 41.7 | 87.9 | 82.1 | 83.7 | 64.7 |
| 3 | — | — | 62.1 | 87.3 | 80.7 | 83.6 | 64.7 |
| 4 | — | — | 38.4 | 88.1 | 82.5 | 83.9 | 65.5 |
| 5 | 22.5 | — | 33.1 | 87.7 | 80.8 | 83.3 | 62.3 |
| 6 | 13.2 | 6.3 | 42.0 | 87.4 | 81.5 | 83.5 | 62.2 |
| 7 | 12.9 | 5.9 | 50.4 | 87.8 | 81.9 | 83.4 | 61.5 |
| 8 | 10.4 | 5.6 | 42.1 | 88.1 | 82.7 | 83.5 | 64.2 |
| 9 | 11.5 | 6.1 | 51.7 | 87.9 | 82.6 | 83.5 | 63.6 |

The test results of the table show the problem to be solved with the invention, i.e. the notable decrease of brightness due to yellowing of the fibre base. which the colourless coating layers on the unpigmented side of the fibre base have been unable to cover. Owing to the pigment, the initial brightness on the opposite side of the fibre base, pigmented with titanium dioxide as in FI patent application 20030260, was high and a slight decrease of brightness has occurred in the autoclave treatment, however, with a final brightness above 80% ISO in each case.

EXAMPLE 5

A test series in conformity with example 4 was carried out with materials of the invention, in which the fibre base consisted of a packaging board made of bleached pulp, having a weight of 250 g/m². One side (the outer side) of this board, which is intended to be the outer surface of the autoclave package, was equipped with a two-layered polypropene coating, in the innermost layer of which polypropene was admixed with carbon black and titanium dioxide (test materials 1 to 7) or merely with carbon black (test materials 8 to 22), and whose outermost layer comprised polpypropene admixed with titanium dioxide alone. In part of the materials (test materials 20 to 22), the opposite board side, which will be the inner surface in the autoclave package, was equipped with an inner light-shield layer based on polypropene and pigmented grey with carbon black (0.15%) and titanium dioxide (12.5%), having a weight of 27 g/m², and with a transparent polypropene layer covering this, having a weight of 23 gm². The measured brightness of said outer material side before and after the autoclave treatment is shown in the following table 5. The table also comprises the pigment concentrations of the pigmented polymer layers on the outside of the material and the layer weights.

TABLE 5

| | Outside coating amounts g/m² | | Pigment concentrations in coating layers (%) | | | Brightness ISO % | |
|---|---|---|---|---|---|---|---|
| Test material | Inner layer | Outer layer | Inner layer C | TiO₂ | Outer layer TiO₂ | Initial | 60 min. |
| 1 | 9 | 19 | 0.15 | 12.5 | 12.5 | 67.7 | 68.2 |
| 2 | 9 | 21 | 0.15 | 12.5 | 12.5 | 70.0 | 70.6 |
| 3 | 9 | 28 | 0.15 | 12.5 | 12.5 | 74.8 | 74.6 |
| 4 | 12 | 25 | 0.15 | 12.5 | 12.5 | 74.2 | 72.3 |
| 5 | 12 | 30 | 0.15 | 12.5 | 12.5 | 74.6 | 75.9 |
| 6 | 12 | 34 | 0.15 | 12.5 | 12.5 | 71.0 | 72.0 |
| 7 | 12 | 41 | 0.15 | 12.5 | 12.5 | 79.9 | 80.1 |
| 8 | 6 | 21 | 0.12 | — | 12.5 | 65.2 | 63.4 |
| 9 | 6 | 30 | 0.12 | — | 12.5 | 76.3 | 75.0 |
| 10 | 6 | 25 | 0.09 | — | 12.5 | 75.4 | 74.1 |
| 11 | 6 | 30 | 0.09 | — | 12.5 | 77.4 | 74.5 |
| 12 | 9 | 23 | 0.09 | — | 12.5 | 67.9 | 67.1 |
| 13 | 9 | 29 | 0.09 | — | 12.5 | 74.2 | 73.2 |
| 14 | 6 | 26 | 0.06 | — | 12.5 | 76.9 | 75.0 |
| 15 | 6 | 30 | 0.06 | — | 12.5 | 77.6 | 73.9 |
| 16 | 9 | 26 | 0.06 | — | 12.5 | 74.6 | 71.0 |
| 17 | 9 | 30 | 0.06 | — | 12.5 | 77.2 | 75.0 |
| 18 | 9 | 33 | 0.06 | — | 12.5 | 80.5 | 78.8 |
| 19 | 9 | 40 | 0.06 | — | 12.5 | 82.3 | 81.0 |
| 20 | 6 | 19 | 0.09 | — | 12.5 | 73.3 | 70.9 |
| 21 | 6 | 25 | 0.09 | — | 12.5 | 77.3 | 75.6 |
| 22 | 6 | 30 | 0.09 | — | 12.5 | 82.5 | 81.2 |

The results show that the packaging material of the invention can be toned to an optimum brightness of above 80% ISO, which undergoes a slight, practically negligible change during autoclave treatment. The final brightness after the treatment is almost the same as in FI patent application 20030260, however, with a clearly improved colour stability of the light shade during the treatment.

The invention claimed is:

1. A method of making a heat-sterilised product package, comprising the steps of:
    providing a packaging material comprising a bleached fibre base and polymer coating layers on both sides of the fibre base, said coating layers comprising an outermost heat-sealing layer having a fusion point of at least 130° C., a first pigmented polymer coating layer containing white pigment, and a second pigmented polymer coating layer containing a light-absorbing pigment;
    making a heat-sealed product package of said packaging material, so as to have said first pigmented polymer coating layer situated on the outside of the package; and
    heat-sterilising the heat-sealed product package in an autoclave, the heat-sealing polymer not fusing in the autoclave and the white pigment toning against yellowing of the fibre base due to heating in the autoclave.

2. The method of making a heat-sterilised product package of claim 1, comprising the step of locating the second coating layer, containing a light-absorbing pigment, inward of the fibre base in the package.

3. The method of making a heat-sterilised product package of claim 1, comprising providing a polymer coating outside the fibre base which contains only white pigment, in order to hide the fibre base from sight.

4. The method of making a heat-sterilised product package of claim 1, wherein the package comprises a polymer layer inside the fibre base which has been toned grey by mixing black and white pigments.

5. The method of making a heat-sterilised product package of claim 1, wherein, outside and inside the fibre base, the pigments are located in the innermost polymer layers covered by a transparent heat-sealable overlay layer.

6. The method of making a heat-sterilised product package of claim 1, wherein, outside the fibre base of the package two successive pigmented polymer layers are provided, with the outer polymer layer containing 5 to 25% of white pigment and the inner polymer layer located closer to the fibre base containing a light-absorbing black pigment.

7. The method of making a heat-sterilised product package of claim 1, comprising the step of providing two successive pigmented polymer layers outside the fibre base in the package, with the outer polymer layer containing 5 to 25% of white pigment and the inner polymer layer located closer to the fibre base containing black pigment, and comprising the further step of providing, inside the fibre base, a polymer layer containing light-absorbing pigment to provide a light shield for the packaged product.

8. The method of making a heat-sterilised product package of claim 1, comprising locating at least one polymeric oxygen-barrier layer inside the fibre base of the package.

9. The method of making a heat-sterilised product package of claim 1, wherein the outside of the heat-sterilised package has a brightness above 80% ISO.

10. The method of making a heat-sterilised product package of claim 1, wherein, prior to heat-sterilising the heat-sealed product package in an autoclave, food is placed in said package to be sterilised in the autoclave.

11. A method of making a heat-sterilised product package, comprising the steps of:
providing a packaging material comprising a bleached fibre base and polymer coating layers on both sides of the fibre base, said coating layers comprising an outermost heat-sealing layer comprising a polymer containing at least 70% polypropene, a first pigmented polymer coating layer containing white pigment, and a second pigmented polymer coating layer containing a light-absorbing pigment;
making a heat-sealed product package of said packaging material, so as to have said first pigmented polymer coating layer situated on the outside of the package; and
heat-sterilising the heat-sealed product package in an autoclave, the heat-sealing polymer not fusing in the autoclave and the white pigment toning against yellowing of the fibre base due to heating in the autoclave.

12. The method of making a heat-sterilised product package of claim 11, comprising the step of locating the second coating layer, containing a light-absorbing pigment, inward of the fibre base in the package.

13. The method of making a heat-sterilised product package of claim 11, comprising providing a polymer coating outside the fibre base which contains only white pigment, in order to hide the fibre base from sight.

14. The method of making a heat-sterilised product package of claim 11, wherein the package comprises a polymer layer inside the fibre base which has been toned grey by mixing black and white pigments.

15. The method of making a heat-sterilised product package of claim 11, wherein, outside and inside the fibre base, the pigments are located in the innermost polymer layers covered by a transparent heat-sealable overlay layer.

16. The method of making a heat-sterilised product package of claim 11, wherein, outside the fibre base of the package two successive pigmented polymer layers are provided, with the outer polymer layer containing 5 to 25% of white pigment and the inner polymer layer located closer to the fibre base containing a light-absorbing black pigment.

17. The method of making a heat-sterilised product package of claim 11, comprising the step of providing two successive pigmented polymer layers outside the fibre base in the package, with the outer polymer layer containing 5 to 25% of white pigment and the inner polymer layer located closer to the fibre base containing black pigment, and comprising the further step of providing, inside the fibre base, a polymer layer containing light-absorbing pigment to provide a light shield for the packaged product.

18. The method of making a heat-sterilised product package of claim 11, comprising locating at least one polymeric oxygen-barrier layer inside the fibre base of the package.

19. The method of making a heat-sterilised product package of claim 11, wherein the outside of the heat-sterilised package has a brightness above 80% ISO.

20. The method of making a heat-sterilised product package of claim 11, wherein, prior to heat-sterilising the heat-sealed product package in an autoclave, food is placed in said package to be sterilised in the autoclave.

* * * * *